March 25, 1958  W. J. PUGH  2,827,961
BELT SLITTING MACHINE
Filed Dec. 5, 1952  5 Sheets-Sheet 1

INVENTOR.
WILLIAM J. PUGH
BY
ATTORNEY

March 25, 1958 W. J. PUGH 2,827,961
BELT SLITTING MACHINE
Filed Dec. 5, 1952 5 Sheets-Sheet 2
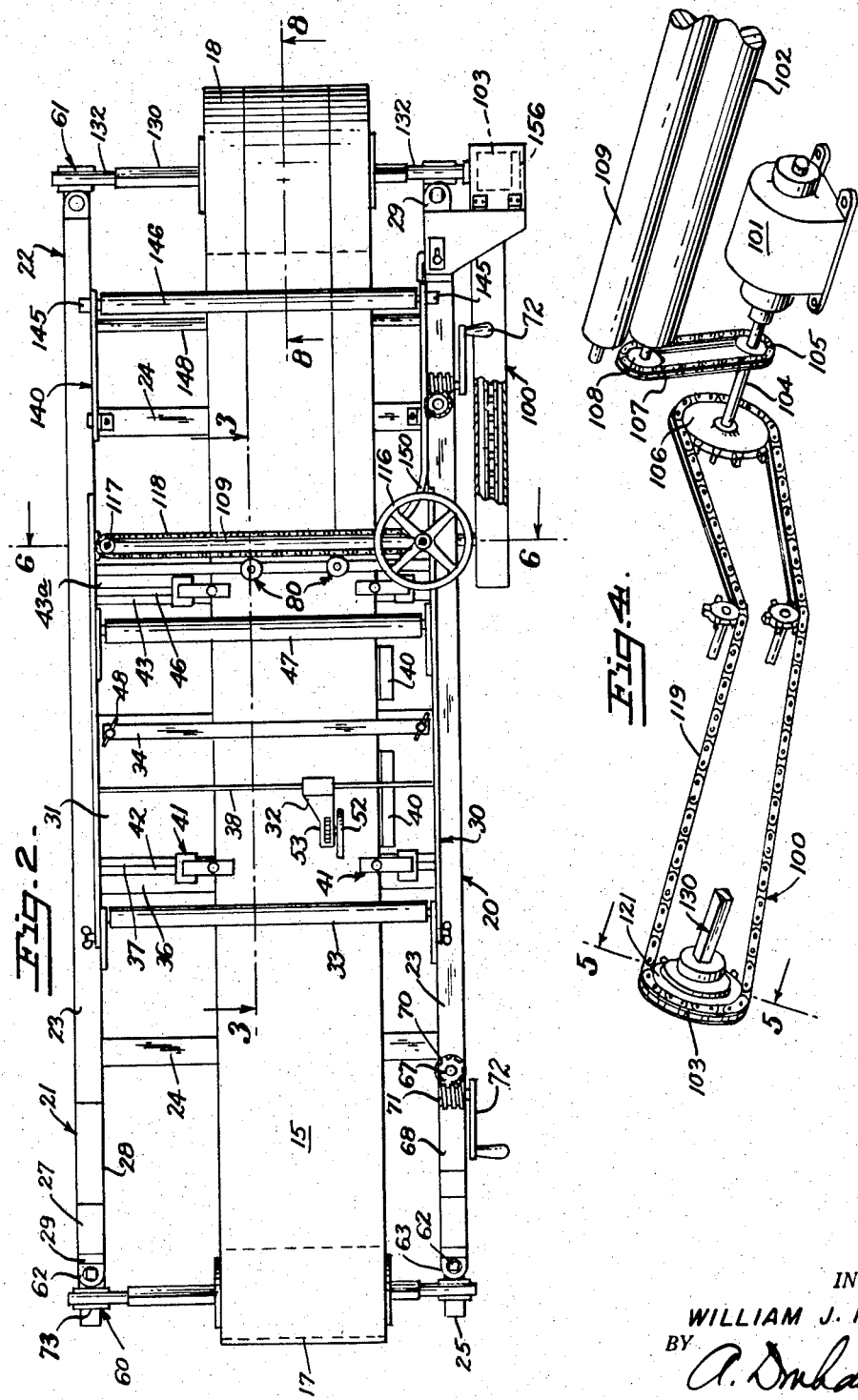
INVENTOR.
WILLIAM J. PUGH
BY
ATTORNEY

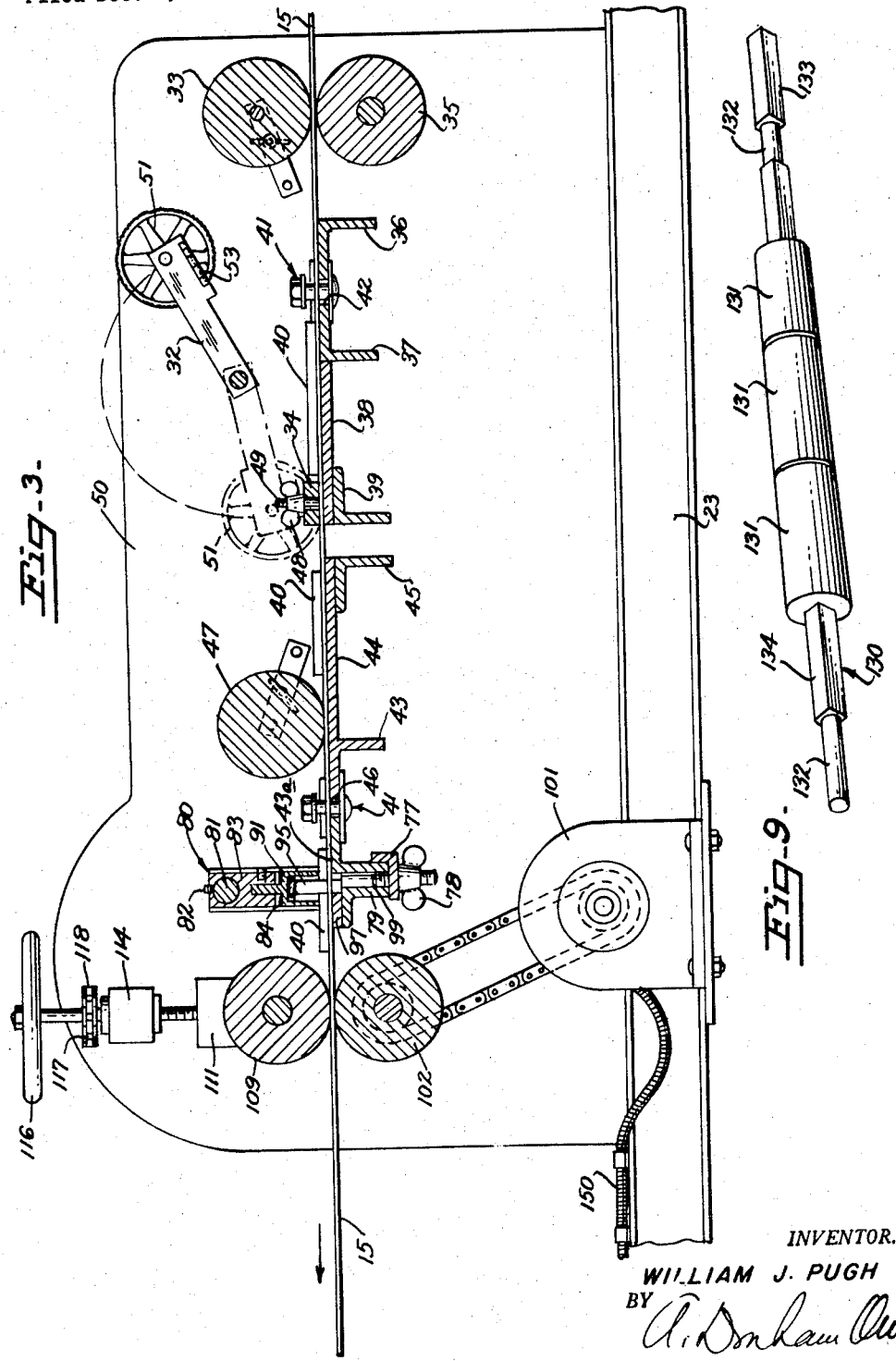

March 25, 1958  W. J. PUGH  2,827,961
BELT SLITTING MACHINE
Filed Dec. 5, 1952  5 Sheets-Sheet 4
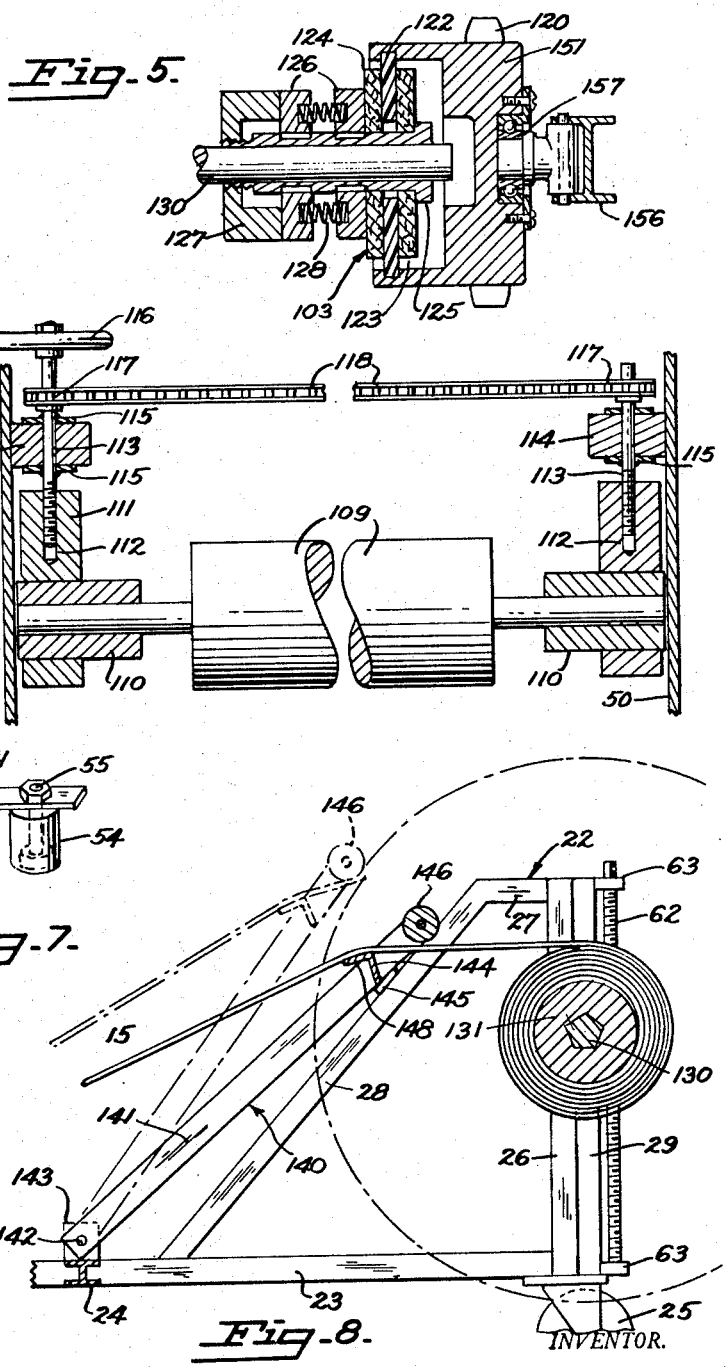
INVENTOR.
WILLIAM J. PUGH
BY
ATTORNEY March 25, 1958 W. J. PUGH 2,827,961
BELT SLITTING MACHINE
Filed Dec. 5, 1952 5 Sheets-Sheet 5
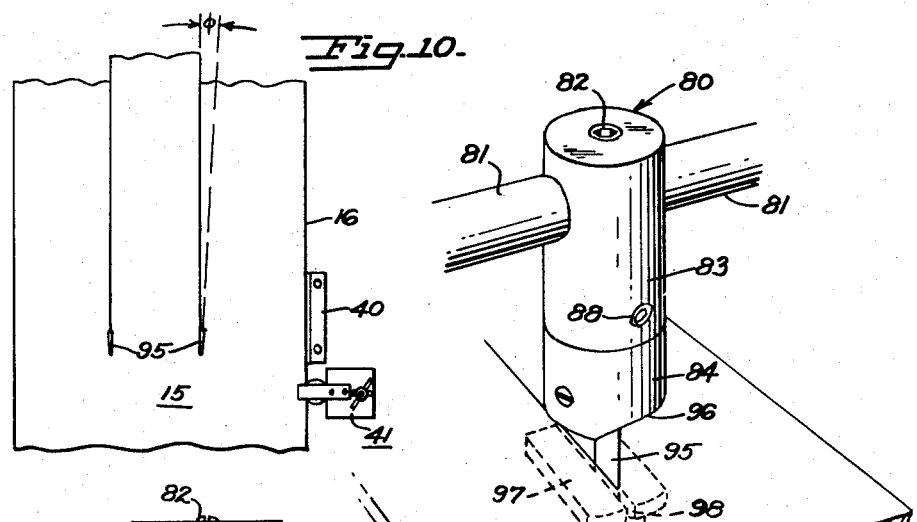
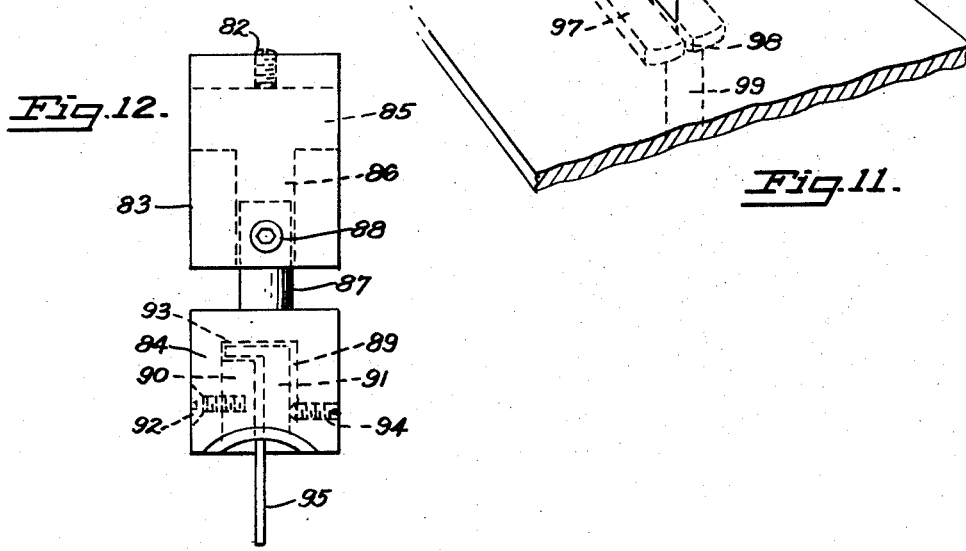
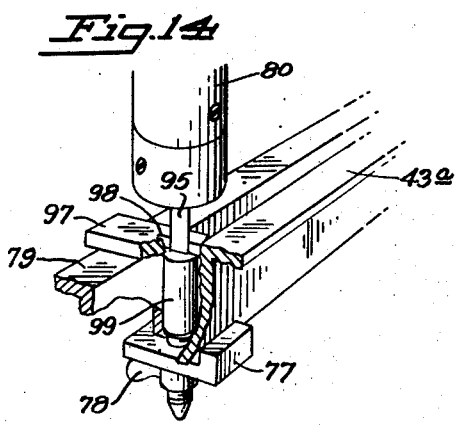
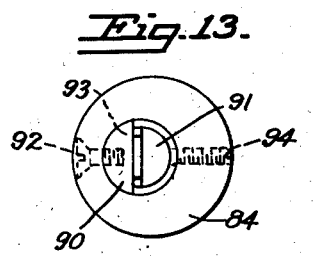
INVENTOR.
WILLIAM J. PUGH
BY
ATTORNEY

United States Patent Office 2,827,961
Patented Mar. 25, 1958

2,827,961

BELT SLITTING MACHINE

William J. Pugh, Piedmont, Calif., assignor, by decree of distribution, to John G. Pugh Application December 5, 1952, Serial No. 324,186

4 Claims. (Cl. 164—39)

This invention relates to a belt handling and cutting machine.

The invention has application to the handling, measuring and cutting of any flat strip of material which is kept in rolls, for example woven fabrics, rubber, or leather, and is particularly well suited for handling rubber and leather belting, such as conveyor belts and transmission belts, or laminated fabric belts for the same purpose. The standard factory roll of belting or slab stock is approximately 400 to 600 feet long, 36 to 48 inches in width, and up to ⅝ inch in thickness, but almost all retail uses for belting or slab stocks are for shorter lengths and narrower widths. Also factory use of slab stock, such as rubber or fabric, invariably requires differing lengths and widths of stocks. In every case where shorter lengths or narrower widths are desired, the retailer or factory worker must measure accurately the desired length and width from the long stock roll, cut it out, and make a new roll from the cut out strip. In previous practice this required several workmen to unroll the heavy stock on a large floor space, measure width and length by hand, cut by hand, and attempt to roll up the cut portion, or portions, into an even roll. This process was not only tedious and time consuming, but was fraught with inaccuracies, wasted warehouse space and manpower, and would dirty or contaminate the stock through contact with the floor.

A solution to some of these problems was offered by Patent No. 2,525,509, issued to William J. Pugh on October 10, 1950. The patented device provided means whereby one man could measure, lengthwise, belt rolls weighing up to 2,000 pounds, and also could squarely cut off the measured portion and rewind it by hand crank. However, a more efficient machine was desired whereby the belting could not only be measured as to length, but could also be simultaneously measured and cut, as to width, while the roll was being unwound. It was further desired that several lengthwise strips could be simultaneously measured, cut, and rewound automatically.

It was discovered that the slitting of stocks, up to ⅝ inch thick, could be accurately controlled best when the stock was moved at constant speed across the cutting knife. However, a constant belt speed across the cutting table could not be maintained by the direct drive from the rewind roll, as was utilized in the above mentioned patent, No. 2,525,509, since as the new roll was wound at constant rotational speed it was apparent that the linear speed on the periphery of the roll would vary as the diameter of the roll increased. Consequently it was necessary to provide some means whereby the peripheral speed of the rewinding roll could be maintained constant so that it would not vary from the constant belt speed desired for cutting the belting into strips.

A still further problem was encountered in maintaining a constant width of cut strips to meet customer or factory requirements. This problem arose because the edges of the original roll of belting were often uneven, resulting in width variations when a perfectly straight cut was being made in from the edge of the roll.

A further problem was presented when the several strips were wound into separate rolls on the same rewind axle. Some means was found necessary to prevent the various rolls from interlocking with one another at their adjacent edges during rewinding. Means were also required to allow separation and easy handling of the separately rolled strips without an additional costly rewinding.

The present invention is directed to the solution of all the above problems, and others that will become evident hereinafter, through the use of a machine that is not only easily and simply operated by one man, but is relatively inexpensive to manufacture, and is capable of handling belt rolls weighing up to 5,000 pounds and measuring up to 6 feet in diameter.

One object of the present invention is to provide a belt handling and cutting means which may be operated at a constant unwinding and cutting speed to insure proper control over the unwinding and cutting operation.

Another object of the invention is to provide a belt handling, cutting, and rewinding means that may be operated at a constant peripheral speed on the rewind roll, regardless of its diameter, so that a constant unwinding and cutting speed may be maintained.

Another object of the invention is to provide a slip coupling between the constant speed unwinding mechanism and the variable speed rewinding mechanism so that the linear belt speed on the variable speed rewinding mechanism cannot exceed the constant linear unwinding speed regardless of the outside diameter of the rewinding roll.

Another object of the invention is to provide a belt handling and cutting method and means whereby rolls of belting may be cut into strips of uniform width regardless of any unevenness in the edge of the original roll.

Another object of the invention is to provide a knife holding device for performing the constant width cutting operation above.

Another object of the invention is to provide a rewind mechanism and guide means allowing a plurality of rolls to be rewound on the same axle without the interlocking of adjacent roll edges, and without interfering with the speedy removal and separation of adjacent rolls.

Other objects and advantages of the invention will be apparent from the following description and from the drawings in which:

Fig. 2 is a plan view of the device of Fig. 1.

Fig. 3 is an enlarged detailed section of the slitting and cut-off table taken along the line 3—3 of Fig. 2.

Fig. 4 is a diagrammatic view of the constant and variable speed drive connections taken from a point inside the machine, looking out.

Fig. 5 is a cross-section of a slip clutch mechanism that might be used in the present invention.

Fig. 6 is a section on the line 6—6 of Fig. 2.

Fig. 7 is an exploded perspective view of a form of adjustable belt guide used in this machine.

Fig. 8 is a section on the line 8—8 of Fig. 2.

Fig. 9 is a perspective view of the rewind axle and sectional rewind roll that forms a part of this invention.

Fig. 10 is a diagrammatic view of the slitting operation.

Fig. 11 is a perspective view of the adjustable slitting-knife holder that forms a part of this invention.

Fig. 12 is a front view of the device of Fig. 11.

Fig. 13 is a bottom view of the device of Figs. 11 and 12.

Fig. 14 is a perspective view broken away in part showing the installation of a knife retaining plate used in this invention.

Figure 1:
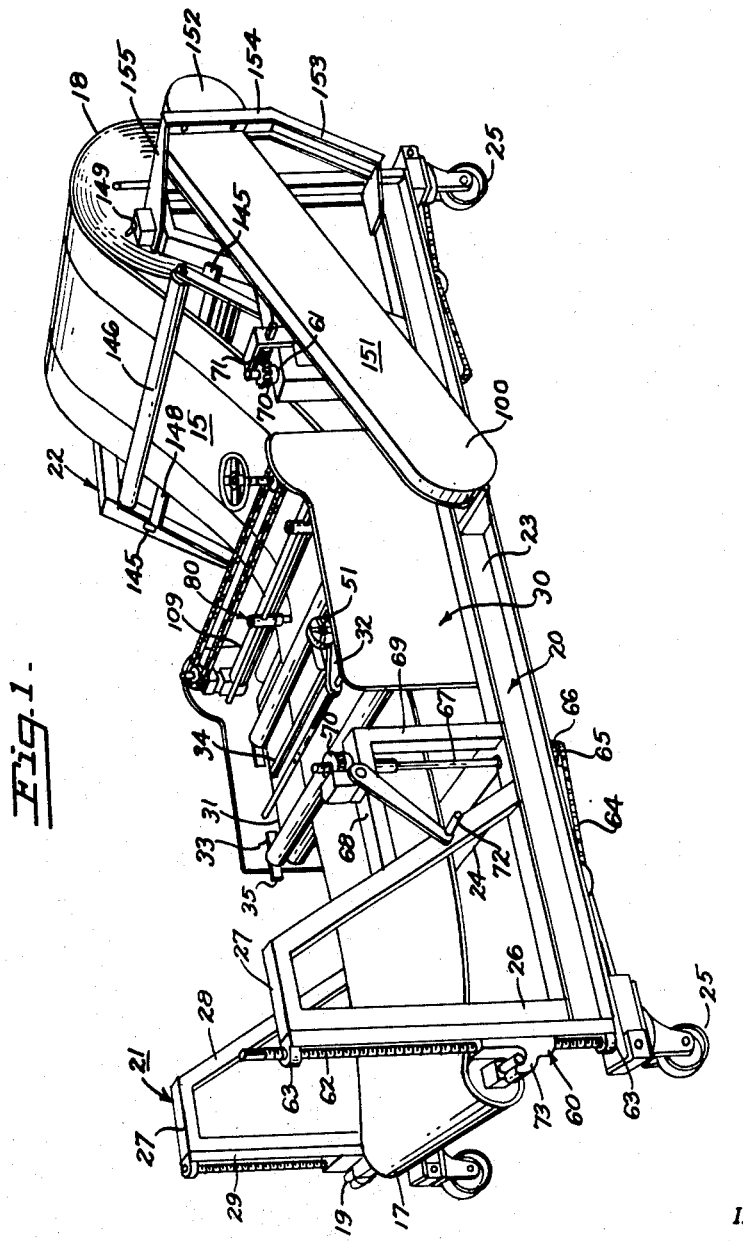
Fig. 1 is a perspective view of the machine embodying the principles of this invention.

Considered broadly, the machine includes a main frame 20, including an unwinding roll support 21 and a rewinding roll support 22; a measuring, slitting, and cut-off assembly 30 including a table 31, a measuring meter 32, slitting devices 80, and a belt cut-off bar 34; a drive 100 for the belt and rewind roll, including a motor 101, a directly driven roll 102, a slip clutch 103 connected to the motor, and a rewind axle 130 driven by the slip clutch 103 (see Fig. 4); and belt hoist assemblies including an unwinding roll hoist 60 and a rewinding hoist 61.

The frame 20 has a base consisting of two lengthwise I beams 23 and two transverse I beams 24, mounted on casters or wheels 25. At the four corners of the base frame are vertical channel members 26 which, with channel members 27 and 28, form supports for the hoist assemblies 60 and 61. Outwardly faced channel members 29 adjacent members 26, form guides for the hoists.

Hoist 60 is used to raise the unwinding axle 19, supporting the factory roll of belting or slab stock 17, off the floor for the unwinding and cutting process. The hoist comprises worm shafts 62 mounted in bearings 63 at either end of channel member 29. At the bottom of each worm shaft is a sprocket (not shown) connected by endless chains 64 to other sprockets 65, mounted on shafts extending below the frame. One of the shafts has an extension 67 journaled in channel member 68, which with vertical member 69 forms a frame support for gear 70, worm 71, and handle 72. In order that both worms 62 may be operated simultaneously by handle 72, additional sprockets 66 are positioned above sprockets 65 and are connected by a chain (not shown) extending below I beam 24. Engaging the worms 62 and sliding in channel members 29 are two shaft supports 73, which support the shaft ends of the roll of belting to be unwound, and which are moved vertically by handle 72.

Rewinding hoist 61 is similar in every respect to hoist 60 and is numbered accordingly, as neither hoist forms a part of this invention. It is noted that other hoisting mechanisms could be used with equal success, such as the cable lifting mechanism or threaded means described in the aforementioned Patent 2,525,509. Hoist 61 is used to lower the rewound roll, or rolls, into any convenient location.

*Measuring, slitting and cut-off mechanism*

Mounted centrally of the machine is a measuring, slitting, and cut-off assembly that is best illustrated in Figs. 2 and 3. As the unwound belting 15 moves into the table assembly, it passes through guide rolls 33 and 35 onto the first table section comprising opposing angles 36 and 37, table plate 38, and plate supporting angle 39. The angles may be attached to side plates 50 in any convenient manner, as by welding, while table plate 38 may be similarly attached to angles 37 and 39. The belt is confined during its passage by fixed belt guides 40 and adjustable guides 41. The guides 41 are adjustably mounted in the slot 42, formed by the angles 36 and 37, in a manner hereinafter more fully described, while the guides 40 are rigidly attached to the table plate. One set of adjustable guides 41 is usually maintained in a fixed position, in a line with the rigid guides 40. The other set of adjustable guides 41 is adjusted in accordance with the width of the belting being handled so that the belting is at all times guided in a straight line to the slitters 80 and drive roll 102.

Adjacent the first table section is a second table section comprising opposing angles 43 and 43a, table plate 44, and table supporting angle 45, arranged similarly to those of the first table section. Again the adjustable guides 41 slide in the slot 46 formed by the angles 43 and 43a.

Mounted above the table plate 44 is a smoothing roller 47 to insure that no wrinkles or waves occur in the belting prior to the slitting operation. The space or slot between the plates 38 and 44 provides a convenient position for belt cut-off. The bar 34 is clamped above the belting by means of wing nuts 48 threaded on guide pins 49, as shown in Fig. 3. The bar 34 is slotted so that when the bar is placed on the guide pins 49 one edge is accurately lined up with the exact point of contact of the measuring wheel 51, shown in dotted line position in Fig. 3. Belt cut-off is accomplished easily by running a knife squarely along the edge of bar 34, or the belt may be machine cut by the means described in the aforementioned Patent 2,525,509, issued to William J. Pugh.

The measuring meter 32 is a standard item, preferably of the type whose rotatable wheel 51 has a roughened periphery 52 to engage and be turned by the belting 15. The exact circumference of the disc 51 may be some convenient standard distance, such as one foot. By a structure well known in the measuring art, rotation of the wheel 51 produces a calibrated reading on a dial or indicator 53 and shows the distance the periphery 52 of the wheel 51 has been moved by the belting 15.

Referring again to adjustable guide members 41, it will be seen in Fig. 7 that the guiding member is a roller 54 rotatably mounted on pin 55 in such manner that it will not drop off, in a well-known manner. The pin is guided in the slots 42 or 46 by the bar 56 depending from clamping plate 57, which overlaps the edges of the slot. A second clamping member 58 is used in connection with the bolt 74 and wing-nut 75 to clamp the guide 41 securely into the slots 42 or 46, as shown in Fig. 3. A spacer bar 59 is welded to the clamping plate 57, so that the roller 54 is mounted at a sufficient height to accommodate belting up to 5/8 inch thick. The slot 76 in clamping plate 57 allows passage of the bolt 74 when the guide 41 is clamped into position.

*The slitter*

The novel slitting mechanism of the present invention will now be described. A plurality of slitting knife holders 80 are pivotally mounted on the circular supporting bar 81, rigidly mounted at either end in the side panels 50. Set screws 82 at the top of holders 80 permit their being fixed at any angular position about the bars 81.

The holders 80 (Figs. 11 to 13) are composed of two main cylindrical portions 83 and 84. The upper cylinder 83 has a transverse cylindrical bore 85 for the bar 81, and an axial cylindrical bore 86 for coupling with the lower cylinder 84. The lower cylinder 84 has an axial cylindrical projection 87 for insertion in the axial bore 86, allowing both relative rotation of the two cylinders about a common axis, and linear movement of the cylinders along a common axis. A set screw 88 may be utilized to lock the two cylinders in any position of axial or lengthwise adjustment.

The lower or knife-holding cylinder has an eccentric cylindrical axial bore 89 in which two semi-cylindrical clamping members 90 and 91 are mounted. Member 90 is spaced from the top of the bore and has a transverse threaded bore so that it may be rigidly clamped to the side of the axial bore 90 by screw 92. The screw 92 passes through a threaded hole in the thinnest wall portion of cylinder 84, as shown in Fig. 13, to impart greater overall strength to the knife holder. Due to the rigid positioning of member 90 and the eccentric bore, the thin wall plus the member 90 about equals, in thickness, the opposite wall portion of cylinder 84. The clamping semi-cylinder 91 has a projecting flange 93 which holds it in place and prevents its removal unless screw 92 is removed. One or more set screws 94 may be used to move member 91 into clamping relation to hold knife blade 95 in position. As shown in the drawings, the lower end of cylinder 84 and clamping members 90 and 91 may be beveled, as at 96, to provide a taper into and away from, the knife blade.

Below the knife blade holder, a complementary knife-retaining plate 97 is mounted on pin 99 having a threaded end. (See Figs. 3, 11, and 14.) This retaining plate is held in position on angle plate 79 and angle 43a by means of a slotted clamping bar 77 and wing-nut 78. The retaining plate has a slot 98 for receiving the lower free end of the knife held by knife holder 80, thereby imparting greater strength and rigidity to the cutting knife blade. This is very important when the belt thickness approaches 5/8 inch. As shown in Fig. 14, the lower end of the slot 98 is closed by the pin 99, preventing the blade from falling through the slot if it is released from the knife holder 80. The top surfaces of plate 97 and angle 43a are flush to maintain a smooth slitting surface. The bottom ends of angle plate 79 and angle 43a are also even to facilitate angular adjustment of the retaining plate 97 in the clamping bar 77. It is apparent that the retaining plate 97 may be angularly adjusted to correspond to any angular adjustment of the knife holder 80.

It is apparent, also, that after lengthwise slits have been cut into the belting by the knives 95, guides such as 40 and 41 would not function properly. Consequently, the guiding is performed, after slitting, in part by the belt slitters themselves, and in part by belt tensioning as hereinafter described. The guiding function performed by the belt slitters is illustrated in Fig. 10, and is accomplished by the angular positioning of the knife blades 95. The fixed angle guide 40 and the roller guide 41 confine the belt edge 16 as the belting is cut. By angling the knife blade a very small amount, such as angle $\phi$, it was found that the belting could be pushed toward the belt edge guides and thereby insure that the cut portion of belting was of uniform width. The sidewise push is gently exerted by the back portion of the cutting knife 95. Care must be taken to adjust the angle so that the transverse guiding function is performed and yet no interference with the slitting operation occurs. Optimum results are obtained when the angle $\phi$ is between 2 and 3 degrees. When plural cuts are made simultaneously by the slitters 95, the guiding function is the same, except that the adjacent cut belt-edge serves as the edge guide for the inner strip. Of course, when the belting is very thin, the guiding function is performed chiefly by the belt tensioning to be described. The same sidewise push that urges the belting against the belt edge guides, also, by doing that very thing, holds the strips apart when they are rewound. It is by the inclination of the knives 95 that this necessary guiding function is obtained, and it is very important, especially when cutting heavy belting.

*Constant speed drive*

The constant speed drive and belt-tensioning mechanism 100, an important feature of this invention, is shown diagrammatically in Fig. 4. The drive mechanism 100 is powered by the reversible motor 101, which has a direct drive connection with the belt driving roll 102 and slip clutch 103. The motor 101 has a shaft 104 keyed into sprocket wheels 105 and 106. Sprocket 105 is linked by chain 107 to sprocket 108, keyed to driving roll 102. The speed of the roll 102 is determined by the relative sizes of the sprockets 105 and 108, and any desired belt speed may be obtained by varying the sprockets. However, a belt speed of about 46 to 48 feet per minute has been found desirable for the desired slitting, guiding, and rewinding characteristics.

The driving connection with the belting is established by means of a squeeze roll 109 which is adjustable vertically with respect to drive roll 102 to regulate the pressure on different thicknesses of belting, as shown in Figs. 3 and 6. Roll 102 is journaled in the side panels 50, while squeeze roll 109 is journaled in bearings 110 fitted into movable bearing blocks 111, which have vertical threaded bores 112. Threaded into the bores 112 are shafts 113, which are rotatably mounted in blocks 114 which, in turn, are rigidly secured to the side panels 50. Stops 115 prevent vertical movement of the shafts 113 in the blocks 114. Keyed to the upper portion of shafts 113 are sprockets 117, which are connected for simultaneous rotation by chain 118. Secured to the top end of one of the shafts 113 is a wheel 116, allowing manual adjustment. When wheel 116 is turned, the blocks 111 and therefore roll 109 must move up or down, depending on the direction of rotation. The "squeeze" exerted on the belting 15 by the rolls 102 and 109 insures that the belting will assume a constant speed equal to the peripheral speed of roll 102.

It is to be observed that the belt drive roll 102 is positioned very close to the slitting devices 80, which gives maximum control over the speed of the slitting operation. Such speed control is very important when slitting very thick or tough belting, and is essential to the proper guiding of the material as it moves through the machine. Variations in speed often cause waves or wrinkles during the slitting operation, giving uneven belt widths or even causing tears.

Inspection of Fig. 1 will disclose that the rewind roll 18 attains many times the size of the drive or squeeze rolls. It is apparent that as the size of the rewind roll 18 increases, the speed of the material on the outside periphery of the roll will also increase, if a constant rotational speed is imparted to the rewind roll by a direct drive. Consequently, a slip clutch 103 is included to gradually reduce the rotational speed of the rewind roll 18 to maintain a constant peripheral speed consonant with the constant belt speed imparted by drive roll 102. The slip clutch is also used to maintain the belting 15 under tension as it passes under the slitters 80 and forms rewind roll 18.

Referring to Figs. 4 and 5, it is noted that sprocket 106 is larger in diameter than sprocket 105, giving chain 119 a greater linear speed than chain 107 and therefore driving roll 102. Chain 119 is in direct driving connection with slip clutch 103, by means of the sprocket teeth 120 on the rotatable body 121 of the slip clutch. The slip clutch 103 may be of any standard design, and is shown diagrammatically in Fig. 5, only by way of illustration, as a single plate type mechanism. Connected to the body 121 is a slip clutch plate 122 which is positioned between friction pads 123 and 124. Pad 123 is rigidly attached to member 125 which is keyed to the rewind axle 130. Pad 124 is slidably mounted in splines on member 125 by means of slide rings 126. Variations between tight or loose slip driving connections are obtained by the adjusting ring 127 and springs 128, mounted between slide rings 126. The slip clutch may be of many other and varied designs, and forms no part of the present invention.

The sprocket 106 and the slip clutch mechanism are mounted outside the main frame 20 and are enclosed in a casing 151 and an enlarged hinged cover portion 152. (Figs. 1 and 2.) Acting as a support for casing members 151 and 152 is an auxiliary frame structure comprising channel members 153 and 154 and triangular plate 155. Mounted on frame support 154 is a bearing support 156 (dotted lines, Fig. 2, and Fig. 5), which provides support for bearing race 157 of a ball bearing mounted in body 121 of slip clutch 103.

Turning briefly to Fig. 9 and the structure of the rewind axle, it will be noted that there are two rounded shaft portions 132 for insertion in the hoist supports 73. A squared extension 133 is provided on one end for insertion in the slip clutch 103. Portion 133 may be integral with axle 130 or a separate stub shaft coupled thereto. Intermediate the axle 130 is a rectangular shaft portion 134 upon which are keyed separate rewind cores 131 which may be formed of wood, plastic, composition material, or metal. Each core corresponds to the width of a portion of belt, being slit so that upon completion of the operation, individual cores with their rewound rolls may be separately removed from the axle 130. The cores are of different lengths to allow any combination of belting widths to be separated from the original roll.

It will be readily seen that the rotatable body 121 of slip clutch 103 may be driven at a rotary speed in excess of that imparted to driving roll 102 by the simple expedient of making the ratio of the diameter of sprocket 106 to clutch body 121 greater than a similar ratio of sprocket 105 to sprocket 108. For the purposes of this invention it is only important that the rotary speed imparted to the rewind axle, through the slip clutch 103, be great enough in relation to the diameters of the wooden cores 131 that the peripheral speed on said cores be equal to or greater than the constant belt speed imparted by the drive roll 102. In other words, the cores 131 must be rotating fast enough, at the initial stages of the rewinding operation, to take up all the belting being unwound by roll 102. If not, slack will form, preventing a tight rewinding operation.

As the rewinding operation continues, the rewind roll 18 will increase in size, and in the absence of slip clutch 103 would tend to impart a greater linear speed to the outer layers of belting due to increased diameter. However, the squeeze exerted by rolls 102 and 109 prevents the belting from exceeding its desired constant speed, and produces a drag on the rewind roll 18 and axle 130, causing slipping to occur in the slip clutch 103. The resulting tension on the belting 15, during rewinding, insures a tight roll, evenly wound.

It has been found desirable to use sprocket ratios giving rewind axle 130 a rotary speed somewhat greater than that imparted to roll 102, when the slip clutch is running free. Thus there will be some slip in clutch 103 in the early rewinding stages, allowing the quick winding action then necessary, with increasing slip as the roll 18 grows larger. Of course, equal initial rotary speeds between axle 130 and roll 102 are operative, but have not proved as satisfactory.

An additional feature of this invention is the rewind guide 140, best seen in Fig. 8. The guide comprises two bars 141 pivoted on pins 142 mounted in brackets 143, which are supported by the frame member 24. Rigidly connecting the two ends of bars 141, as by welding, is an angle bar 144. Flanges 145 support the guide 140 on the frame support members 28. In the early stages of rewinding the flat portion 148 of angle bar 144 guides the cut strips horizontally into the rewind roll. As the rewind roll 18 grows in size, it presses against a roller 146 journaled in the ends of bars 141 and rides out to the dotted position shown in Fig. 8. This insures a guiding function during all stages of the rewinding operation and prevents interlocking caused by overlapping of adjacent edges of the separate rewind rolls as they are wound on their cores 131. This guiding function is obtained by cooperation with the inclined knives 95. Without the rewinding mechanism the guiding would serve only the function of keeping the slitting straight, but in applicant's combination the elements cooperate to aid in keeping the slit strips aligned for rewinding. As a result, the separate rewind rolls may be readily slipped off the axle 130 when desired.

The operation of the machine is as follows:

The belt slitting machine, which is easily operated by one man, is pushed on its casters 25 up to the roll of belting 17 which is to be unwound, slit, and cut off. Roll 17 is lifted off the floor by the unwinding hoist 60. The belting is then threaded by hand through the guide rolls 33 and 35 and under the smoothing roll 47, the meter 32 being swung into position at any desired point, such as the belt end. Adjustable belting guides 41 are moved into transverse alignment, and the slitter, or slitters, 80 are positioned to cut off the width, or widths, of belt desired. For this purpose support bar 81 may be marked with any desired set of graduations, measured from a point above the line of belting guides 40. The initial slits are preferably started by hand until the squeeze roll 109 is tightened to give the belting a driving connection with powered roll 102.

The machine is now started by the reversing switch 149 which is connected to the motor 101 through cable 150. When the belt end reaches the rewind roll, the machine is stopped, and the belt end is attached to rewind cores (corresponding in size to the belt widths being cut) by means of nails, tacks, screws, or in any other convenient manner.

The machine is now ready to automatically unwind roll 17; slit it into lengthwise strips, as desired; and to rewind the strips into separate tight rewind rolls 18. During operation, the drive roll connection 102, 109 insures constant belting speed past the slitters, giving maximum control; while the slip clutch connection 103 insures a tightly wound belt, without slack, regardless of the diameter of the rewind roll or rolls 18. The proximity of the drive roll 102 to the slitters 80 gives the maximum power and control required for high-speed slitting of belting having thicknesses up to ⅝ inch. The slight angular adjustment given to the slitting knives provides strips of substantially even width throughout their length without any noticeable sacrifice of slitting efficiency; while the guide bar 140 prevents interlocking of the lengthwise strips caused by their overlapping as they rewind into rolls 18, regardless of the size of the rewind rolls.

When the desired length of belting is metered out, the operator stops the machine, and upon placing bar 34 in the cut-off position, as shown in Figs. 2 and 3, cuts off the belt squarely and evenly. The machine is again started to complete the slitting and rewinding of that portion of the belt end remaining between bar 34 and slitters 80 after the cut-off operation.

The rewound strips of belting 18 may be lowered into a rack by the lowering hoist 61 and the separate rolls removed as desired; while the remaining portion of the unwound belting roll 17 may be returned or taken to any desired point.

It will be observed that the foregoing machine provides an easy efficient means, operable by one man, to unwind, slit, and cut off portions of large heavy rolls of belting or slab stock, at great savings of time, labor, and material costs.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In an apparatus for slitting heavy belting at a constant speed and winding the resultant narrower strips into rolls at a constant speed on a single axle, while keeping a separation between adjacent said rolls, the combination of a frame; constant speed belt driving means supported by said frame; edge guide means at the sides of said frame, adapted for engagement by the side edges of said belting; at least one stationary, straight-edged, belt-slitting knife mounted with its blade generally vertical and immediately adjacent said belt-driving means, said blade being inclined at a small angle relative to the direction along which said belt is moved; and winding means on said frame for forming a plurality of coaxial belting rolls around a single axle on the opposite side of said rollers from said knife, said winding means being driven through a slip clutch by said belt-driving means, the inclination of said knife exerting a sidewise push by the back edge thereof, urging the split belting portions outwardly against their respective edge guide means, and so that the strips are rewound in alignment with their edge guide means.

2. The apparatus of claim 1 wherein a guide roller is held by arms pivoted to said frame for gravity contact adjacent the periphery of said rolls to prevent interlocking caused by the tendency of said rolls to overlap their adjacent edges.

3. In an apparatus for slitting heavy belting at a constant speed and winding the resulting narrower strips into roll at a constant speed on a single axle while keeping a separation between adjacent said rolls, the combination of a frame; belting-edge guide means extending lengthwise along said frame; constant speed power driving means supported by said frame; a lower belt-contacting roller supported by said frame and driven by said power means; an upper idling belt-contacting roller supported on said frame for passage of said belt between said rollers; means for translating said upper roller vertically for squeezing said belt against said lower roller; at least one stationary, straight-edged, belt-slitting knife mounted with its blade generally vertical and immediately adjacent said rollers in the direction from which the belt is moved toward them, said blade being inclined at a small angle relative to the direction along which said belt is moved; and winding means on said frame for forming a plurality of coaxial belting rolls around a single axle on the opposite side of said rollers from said knife, said winding means being driven through a slip clutch by said power means, the drag of said rollers resulting in slippage of said slip clutch and constant peripheral speed of said strips as they are wound, the inclination of said knife guiding adjacent strips against their respective edge guide means to insure slitting at a uniform width.

4. In an apparatus for slitting heavy belting at a constant speed and winding the resultant narrower strips into rolls at a constant speed on a single axle while keeping a separation between adjacent said rolls, the combination of a frame; means lengthwise of said frame for guiding the edges of said belting therealong; constant speed power driving means supported by said frame; a lower belt-contacting roller supported by said frame and driven by said power means; an upper idling belt-contacting roller supported on said frame for passage of said belt between said rollers; means for translating said upper roller vertically for squeezing said belt against said lower roller; at least one stationary, straight-edge, belt-slitting knife mounted with its blade generally vertical immediately adjacent said rollers in the direction from which the belt is moved toward them, said blade being inclined at a small angle relative to the direction along which said belt is moved; winding means on said frame for forming a plurality of coaxial belting rolls around a plurality of cores keyed to a single axle on the opposite side of said rollers from said knife, said winding means being driven through a slip clutch by said power means, the drag of said rollers resulting in slippage of said slip clutch and constant peripheral speed of said strips as they are wound, the inclination of said knife guiding adjacent strips into engagement with said edge guiding means so that the widths of the strips remain constant as said slitting proceeds; a pair of arms pivoted to said frame and a guide roller rotatably supported by the outboard ends of said arms for rolling contact with the belting adjacent the peripheries of said rolls, thereby preventing interlocking of adjacent rolls by overlapping of their edges as they are wound.

References Cited in the file of this patent
UNITED STATES PATENTS

| | | |
|---|---|---|
| 297,936 | Inman | Apr. 29, 1884 |
| 441,476 | Ford | Nov. 25, 1890 |
| 510,034 | Levedahl et al. | Dec. 5, 1893 |
| 537,163 | Lees | Apr. 9, 1895 |
| 697,985 | Conrad et al. | Apr. 22, 1902 |
| 841,037 | McKinley | Jan. 8, 1907 |
| 909,853 | Denison | Jan. 12, 1909 |
| 1,211,185 | Leathem | Jan. 2, 1917 |
| 1,234,884 | Dozier et al. | July 31, 1917 |
| 1,290,097 | Cook | Jan. 7, 1919 |
| 1,299,335 | Hazeltine | Apr. 1, 1919 |
| 1,318,341 | Arnold et al. | Oct. 7, 1919 |
| 1,419,144 | Kent | June 13, 1922 |
| 1,808,859 | Morrow | June 9, 1931 |
| 1,839,047 | Parsons | Dec. 29, 1931 |
| 1,861,374 | Wood | May 31, 1932 |
| 1,984,500 | Tautz | Dec. 18, 1934 |
| 2,454,003 | Pamphilon | Nov. 16, 1948 |
| 2,525,509 | Pugh | Oct. 10, 1950 |
| 2,526,029 | Judelson | Oct. 17, 1950 |
| 2,534,015 | Gerstein et al. | Dec. 12, 1950 |
| 2,592,090 | Weaver | Apr. 8, 1952 |
| 2,593,154 | Judelson | Apr. 15, 1952 |
| 2,594,932 | Judelson | Apr. 29, 1952 |
| 2,621,736 | Scruggs et al. | Dec. 16, 1952 |
| 2,645,270 | Speed et al. | July 14, 1953 |
| 2,648,380 | Socke | Aug. 11, 1953 |
| 2,658,693 | Wolf | Nov. 10, 1953 |
| 2,672,196 | Gross et al. | Mar. 16, 1954 |
| 2,681,702 | Kuenn et al. | June 22, 1954 |